UNITED STATES PATENT OFFICE.

SAMUEL JOHNSTON, OF BROCKPORT, NEW YORK.

PROCESS OF MANUFACTURING ARTICLES OF STEEL AND STEELY IRON.

SPECIFICATION forming part of Letters Patent No. 309,507, dated December 16, 1884.

Application filed February 27, 1883. (No specimens.)

*To all whom it may concern:*

Be it known that I, SAMUEL JOHNSTON, of Brockport, Monroe county, New York, have invented a new and useful Improvement in the process or method of producing and improving the quality of those articles of steel and steely iron which require a smooth or finished surface—that is, such as are required to be brought to an exact size and shape—of which the following is a specification.

My invention relates to a process of manufacturing finished articles from hard metal, like steel or steely iron, whereby the qualities and skin due to casting are obtained and preserved—that is to say, my invention relates to a process or method of manufacturing articles of cast-steel, or steely iron having a smooth or finished surface, wherein these metals are compressed and the surfaces are rendered smooth, and the article is brought to the desired finished condition without abrading or destroying the cast skin; and to this end it consists in the process or method of working metals of the character referred to by casting the same into shapes approximating those desired, but having slight irregularities or variations therefrom at the surface, and then compressing the blanks so obtained between dies.

In the production of cast articles of the character of metals referred to, where it is necessary to have a smooth or finished surface, as hitherto practiced, the casting has been completed or finished by chipping, turning, milling, planing, or grinding the exterior surface, and by boring or drilling the interior surface. In short, the skin or toughest part of the metal has been abraded or cut away to produce the desired exactness of size and form and finish of surface.

In the production of drop-forgings, so far as known to me, wrought-iron or steel blocks are first wrought to approximate form by roughing-dies and breaking-down dies, and the surplus metal is thrown off in the form of fins, which must be cut away by trimming-dies, thus making a large percentage of scrap, and when holes are required in the forging, plugs or mandrels are placed in the dies opposite each other, but they cannot come together. They force the metal outward and leave between them a web to be afterward punched out as scrap. In these cases the article must be finished either by cutting or abrading, as with the cast blank, or must be transferred to other finishing-dies to impart the desired finished shape and surface. Moreover, chambered articles cannot be produced, so far as I am informed, by the ordinary processes of drop-forging; but by my process the casting may be cored in well-known ways and a blank obtained with any desired form or size of cavity or chamber, and the exterior surface may be condensed and smoothed in the same manner as a solid blank. The surface of the edges or openings to the cavities or chambers may also be compressed to smoothness by my process. This chambering and coring process also serves another useful office, to wit: in case of imperfections in the molding, so that surplus stock is attached to any part of the cast blank when subjected to the action of the dies, this surplus stock flows into the chambered part and thus lessens the tendency to throw out a fin, and allows the dies to come together.

I have discovered that the surface of cast-steel or steely iron will flow or may be upset to a limited extent, and that slight inequalities or projections may be made to flow inward and fill up corresponding notches or cavities, and thus articles may be produced from castings having the finished form and surface desired without abrading or cutting away the skin, and without crushing or upsetting the entire body of the metal, as in coinage and ordinary drop-forging.

In carrying out my process I cast the metal into a shape approximating in general contour that which it is to have when completed, but varying at the surface somewhat, so as to allow the surface metal to flow under the action of the compresing-dies to such limited extent as to fill up the dies and fill up the slight depressions in the surface. It should be observed that a practically good article may be obtained when the surface has been compressed and the sharp irregularities condensed and forced into the adjacent spaces, notwithstanding said spaces may not be entirely filled. A very little experience and practice, however, will enable one skilled in the art to adapt the casting relative to the compressing-dies so the desired result may be obtained.

By properly proportioning the blank or approximating casting and the compressing-dies the desired surface may be imparted without producing any perceptible fin on the finished article. After the blank is cast to approximate shape and size the same is subjected to pressure between dies slightly smaller than the extreme projections from the general contour in a drop-power or hydraulic press.

Obviously cast-iron blanks may be decarburized by well-known processes to convert them into steel or steely iron, and then finished by compression, as above described. The cast blank may be reheated to any desired extent before being subjected to pressure in the finishing-dies.

It will be seen that the hard skin of the casting is not ground or cut away by my process, and, while the surface is not brightly polished, it is quite as smooth, has a harder and better wearing-surface, and will resist corrosive action better.

Having thus described my invention, what I claim is—

The method, substantially as described, of giving to rough castings of hard metal—such as articles of steel or steely iron—a smooth or finished surface, which consists in taking a casting approximating the desired dimensions and subjecting the same to the action of compressing-dies corresponding in shape and size with the desired finished article.

In testimony of which invention I hereunto set my hand.

SAMUEL JOHNSTON.

Witnesses:
G. H. RAYMOND,
H. C. HAMMOND.